(12) United States Patent
Larson et al.

(10) Patent No.: US 6,594,258 B1
(45) Date of Patent: Jul. 15, 2003

(54) INTEGRATED HOME LOCATION REGISTER AND IP-SS7 GATEWAY

(75) Inventors: Dave Larson, Cary, NC (US); Mats Hoglund, Cary, NC (US); Hans Mo, Cary, NC (US); Mikael Nilsson, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/320,220

(22) Filed: May 26, 1999

(51) Int. Cl.[7] .............................................. H04L 12/56
(52) U.S. Cl. ...................................... 370/353; 370/466
(58) Field of Search ................................ 370/352, 353, 370/466, 467, 469, 522; 379/219, 220.07; 455/403, 422, 445

(56) References Cited

U.S. PATENT DOCUMENTS

| | | | | |
|---|---|---|---|---|
| 5,890,064 A | * | 3/1999 | Widergen et al. ............ | 455/445 |
| 5,920,820 A | * | 7/1999 | Qureshi et al. .............. | 455/433 |
| 6,115,754 A | * | 9/2000 | Landgren ..................... | 709/236 |
| 6,178,181 B1 | * | 1/2001 | Glitho ......................... | 370/467 |
| 6,185,425 B1 | * | 2/2001 | Lindgren et al. ............ | 455/445 |
| 6,453,162 B1 | * | 9/2002 | Gentry ........................ | 455/445 |

FOREIGN PATENT DOCUMENTS

EP          9914910          3/1999

OTHER PUBLICATIONS

Case, et al RFC 1157, May 1990 (http://www.hio.hen.nl/cgi-bin/show-gz/rfc/snmp/rfc1157.txt.gz).*

* cited by examiner

Primary Examiner—Salvatore Cangialosi
(74) Attorney, Agent, or Firm—Wood, Phillips, VanSanten, Clark & Mortimer

(57) ABSTRACT

An integrated IP-SS7 gateway and home location register system is disclosed for transmitting and receiving messages in a wireless communication network. The system comprises a processing system including a home location register (HLR) storing wireless user subscriber information. A first interface is in communication with a wireless office system (WOS) network for routing messages using a TCP/IP protocol. A second interface is in communication with a public land mobile network (PLMN) for routing messages using an MTP protocol. A gateway function is operatively connected to the HLR and the first and second interfaces for controlling message transmission therebetween.

29 Claims, 4 Drawing Sheets

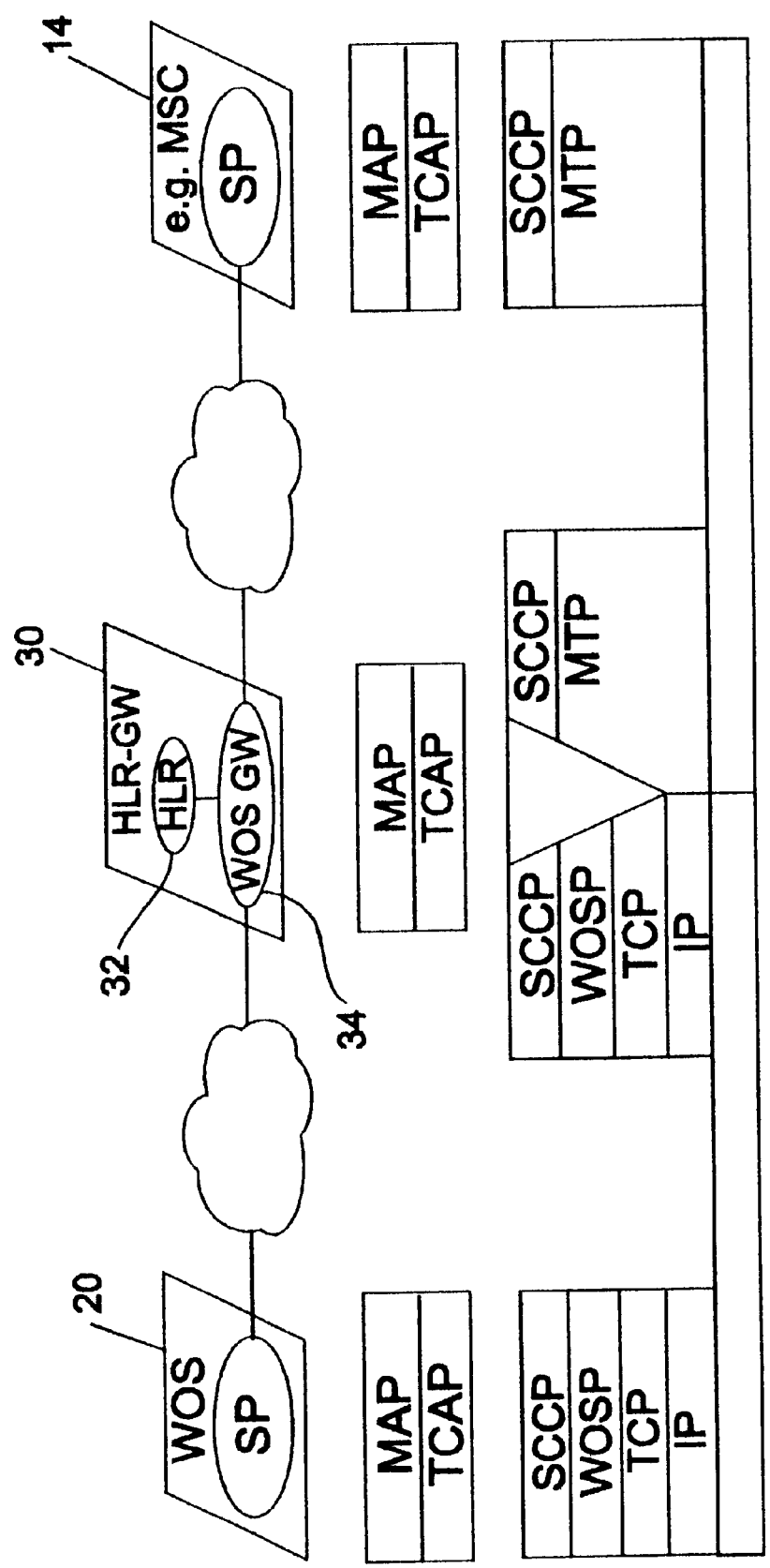

INTEGRATED HOME LOCATION REGISTER AND IP-SS7 GATEWAY

FIELD OF THE INVENTION

This invention relates to wireless office communication systems and, more particularly, to an integrated IP-SS7 gateway and home location register.

BACKGROUND OF THE INVENTION

A wireless communication system, in the form of a cellular system, is designed to cover a large geographic area. The system is divided into numerous cells providing air interface between mobile stations and land-based systems. The network interfaces described herein are based on the ANSI-41 intersystem communications standard. This standard defines the functionality for a Mobile Application Part (MAP) for personal communication systems (PCS). Messages are sent via signaling system 7 (SS7) protocols.

Recently, cellular based system design is being used as a foundation for smaller systems, such as a wireless office system (WOS). One such WOS employs time-division multiple access (TDMA) technology to deliver a private communication environment that is flexible and compatible with existing digital wireless networks.

A TDMA WOS may be associated with a TDMA PLMN and requires a way to transmit and receive ANSI-41 messages. These messages are normally sent via SS7 protocols and routed using either direct point code (PC) routing or global title translation (GTT).

One design of a WOS contemplates connecting to the SS7 network through use of a WOS gateway. The gateway is a separate physical node serving one or more WOSs. From the perspective of the SS7 network, the WOS is a signaling point (SP) with its own point code. However, this system adds an additional physical node to the network architecture, which results in more equipment in the network and a larger number of nodes to configure. This design requires that any purchaser of the WOS also has access to this gateway node, or provide the same functionality separately.

The vast majority of the messages that the gateway passes between the WOS and the SS7 network are for a home location register (HLR) which stores wireless user subscriber information. In order to communicate with the HLR, the gateway must process the messages and perform a protocol conversion. This increases processing and delays in operation of the WOS.

The present invention is directed to overcoming one or more of the problems discussed above in a novel and simple manner.

SUMMARY OF THE INVENTION

In accordance with the invention there is provided an integrated home location register and wireless office system gateway.

Broadly, there is disclosed herein a router controlling message communication between a first wireless communication network that transmits and receives messages using a TCP/IP protocol and a second wireless communication network that transmits and receives messages using an MTP protocol. The router includes an integrated processing system including a home location register (HLR) storing wireless user subscriber information. A first interface communicates with the first wireless communication network using the TCP/IP protocol. A second interface communicates with the second wireless communication network using the MTP protocol. A gateway function is operatively connected to the HLR and the first and second interfaces for controlling message transmission therebetween.

It is a feature of the invention that the HLR stores subscriber information for users of both the first wireless communication network and the second wireless communication network. The gateway function transmits and receives HLR subscriber information with either network directly without protocol conversion.

It is another feature of the invention that the gateway function converts protocol of messages between TCP/IP and MTP for messages to be transferred from one of the networks to the other of the networks. The gateway function translates global titles received from the second wireless communication network to IP addresses for the first wireless communication network.

It is another feature of the invention that the gateway function operates as a signaling transfer point for the second wireless communication network via the second interface.

It is still a further feature of the invention that the gateway function operates as a termination point for first wireless communication network protocols. The first wireless communication network protocols may support monitoring of communication between the first wireless communication network and the gateway function or transport of configuration messages.

There is disclosed in accordance with another aspect of the invention an integrated gateway and home location register system for transmitting and receiving messages in a wireless communication network. The system comprises a processing system including a home location register (HLR) storing wireless user subscriber information. A first interface is in communication with a wireless office system (WOS) network for routing messages using a TCP/IP protocol. A second interface is in communication with a public land mobile network (PLMN) for routing messages using an MTP protocol. A gateway function is operatively connected to the HLR and the first and second interfaces for controlling message transmission therebetween.

More particularly, the present invention relates to combining gateway functionality of a WOS into an HLR. This system directly sends ANSI-41 messages from the WOS to the HLR using TCP/IP protocol. Additionally, since the HLR maintains SS7 routing information for the network, it is adapted to perform protocol conversion and routing functionality of the gateway without the need of an additional node.

Further features and advantages of the invention will be readily apparent from the specification and from the drawing.

BRIEF DESCRIPTION OF THE DRAWINGS

FIG. 4 is a layer diagram illustrating protocol stacks for the system of FIG. 3.

DETAILED DESCRIPTION OF THE INVENTION

Figure 1:
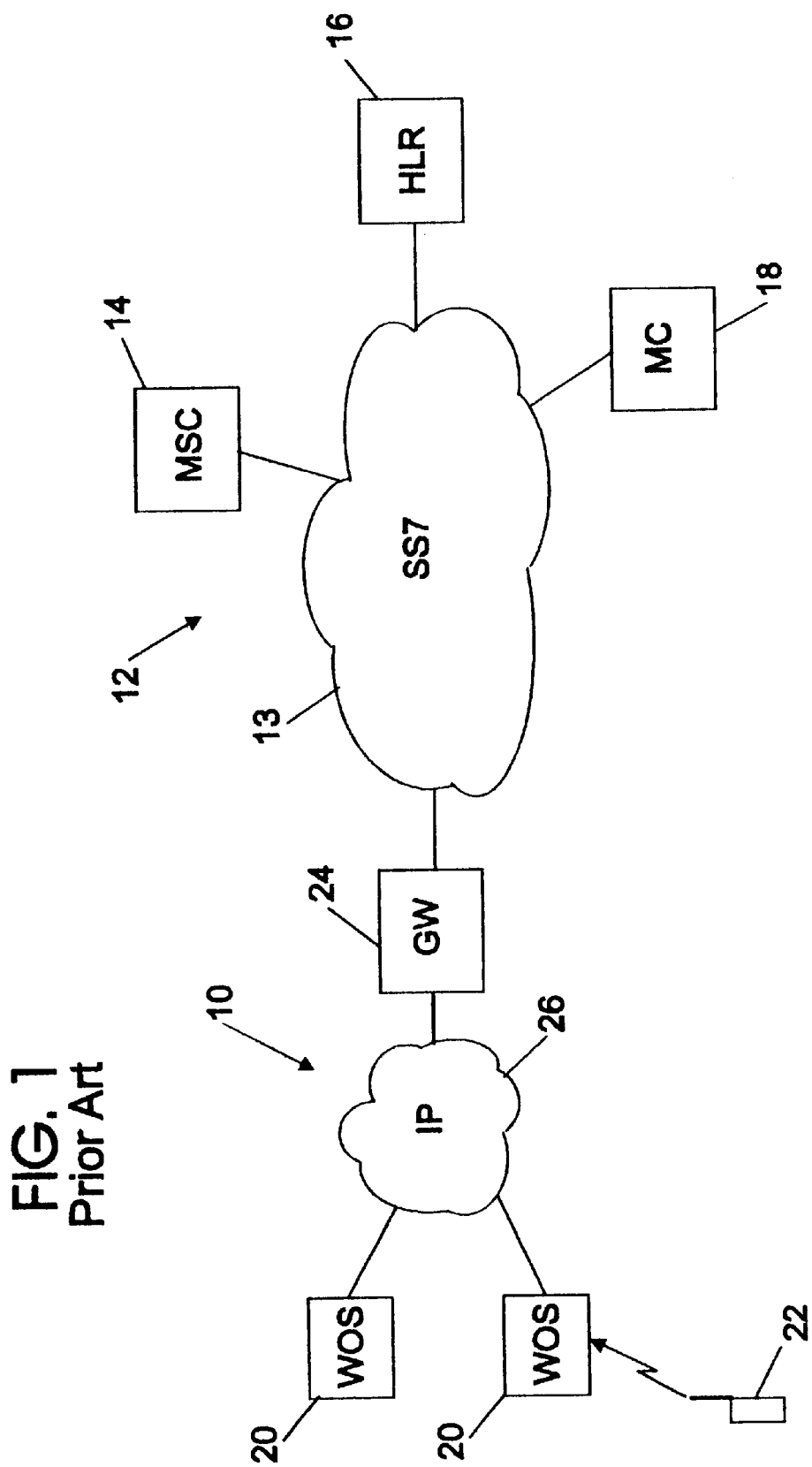
FIG. 1 is a network block diagram illustrating a prior art wireless office system associated with a public land mobile network.

Referring to FIG. 1, a block diagram illustrates a time-division multiple access (TDMA) wireless office system (WOS) 10 associated with a TDMA public land mobile network (PLMN) 12. The PLMN 12 may be of any desired configuration and is particularly adapted for transmitting and receiving messages using ANSI-41 standards. These messages are normally sent via signaling system 7 (SS7) protocol as illustrated by the network "cloud" 13. In the illustrated embodiment of the invention, the PLMN 12 includes plural nodes. These nodes include a mobile switching center (MSC) 14, a home location register (HLR) 16 and an MC block 18 representing multiple carriers.

The WOS system 10 includes plural WOS blocks 20, two of which are illustrated. The WOS 20, in accordance with the invention, may take any desired form. For example, the WOS 20 may include a private branch exchange (PBX) as a switching center to receive calls from, and send calls to, the public switched telephone network (PSTN). The PBX may in turn be connected to a hub which controls and coordinates wireless connection among a plurality of fixed radio heads and various wireless devices, such as a mobile station 22. The mobile station 22 can also be configured to directly communicate in the PLMN 12. The WOS system 10 is adapted to operate as a reduced scale version of the PLMN 12 in controlling communication with the mobile station 22. For example, the system 10 is used to initiate service with the mobile station 22 and provide handoffs and the like as the mobile station moves within the WOS system 10.

To enhance operations, one such WOS system 10 connects to the PLMN 12 through the use of a WOS gateway 22. The gateway 24 is a separate physical node serving one or more WOSs 20. From the PLMN network 12 point of view, the gateway 24 is a signaling point (SP) with its own point code (PC). The gateway 24 and WOS blocks 20 communicate via a network 26 using Internet protocol (IP).

Figure 2:
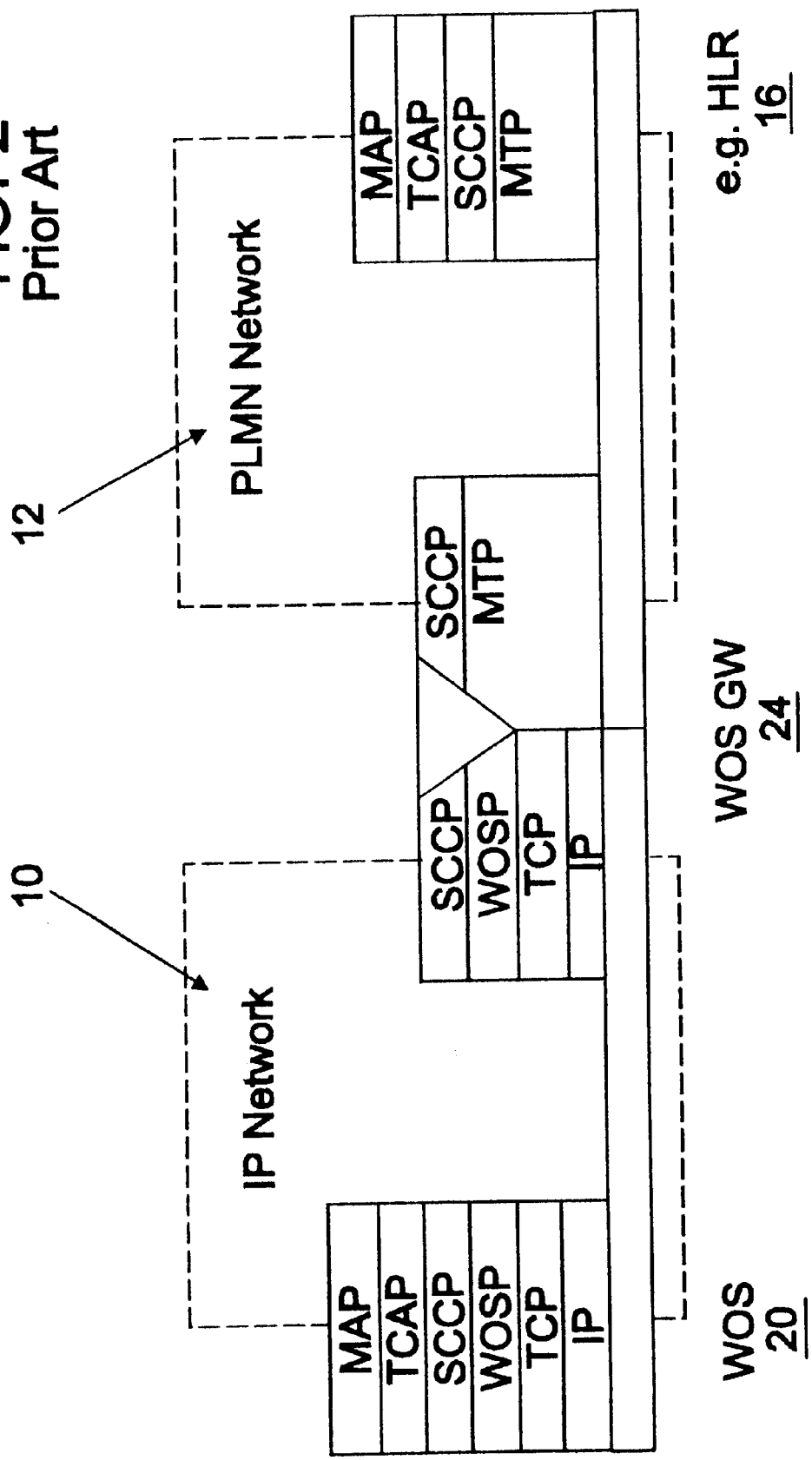
FIG. 2 is a layer diagram illustrating protocol stacks for the system of FIG. 1.

Referring to FIG. 2, the WOS system 10 uses the SCCP, TCAP, and MAP layers of the SS7 protocol stack on top of a TCP/IP protocol stack to transport ANSI-41 messages to the gateway 24. The gateway 24 converts the messages from riding atop the TCP/IP protocol stack to riding on the MTP layers of the SS7 protocol stack. Particularly, the gateway 24 acts as a router in that it is a signaling transfer point (STP) in the SS7 protocol, and performs GTT for messages from the WOS system 10. This frees the WOS 20 from having to maintain point code tables. The reformatted message is then sent on to its final destination from the gateway 24. The gateway 24 also receives SS7 messages meant for the WOS system 10 and determines which WOS 20 is being addressed if necessary, and repacks the messages onto TCP/IP for delivery to the particular WOS 20.

The illustrated gateway 24 adds an additional physical node to the network architecture. This results in more equipment in the network and a larger number of nodes to configure. It also requires that a purchaser of the WOS system 10 has access to this node, or provides the same capability separately. The vast majority of messages in the WOS system 10 are to the associated HLR 16. These messages provide subscriber information used for controlling communication with the mobile station 22.

In accordance with the invention, the HLR is integrated with a WOS gateway so that for HLR messages protocol conversions are unnecessary.

Figure 3:
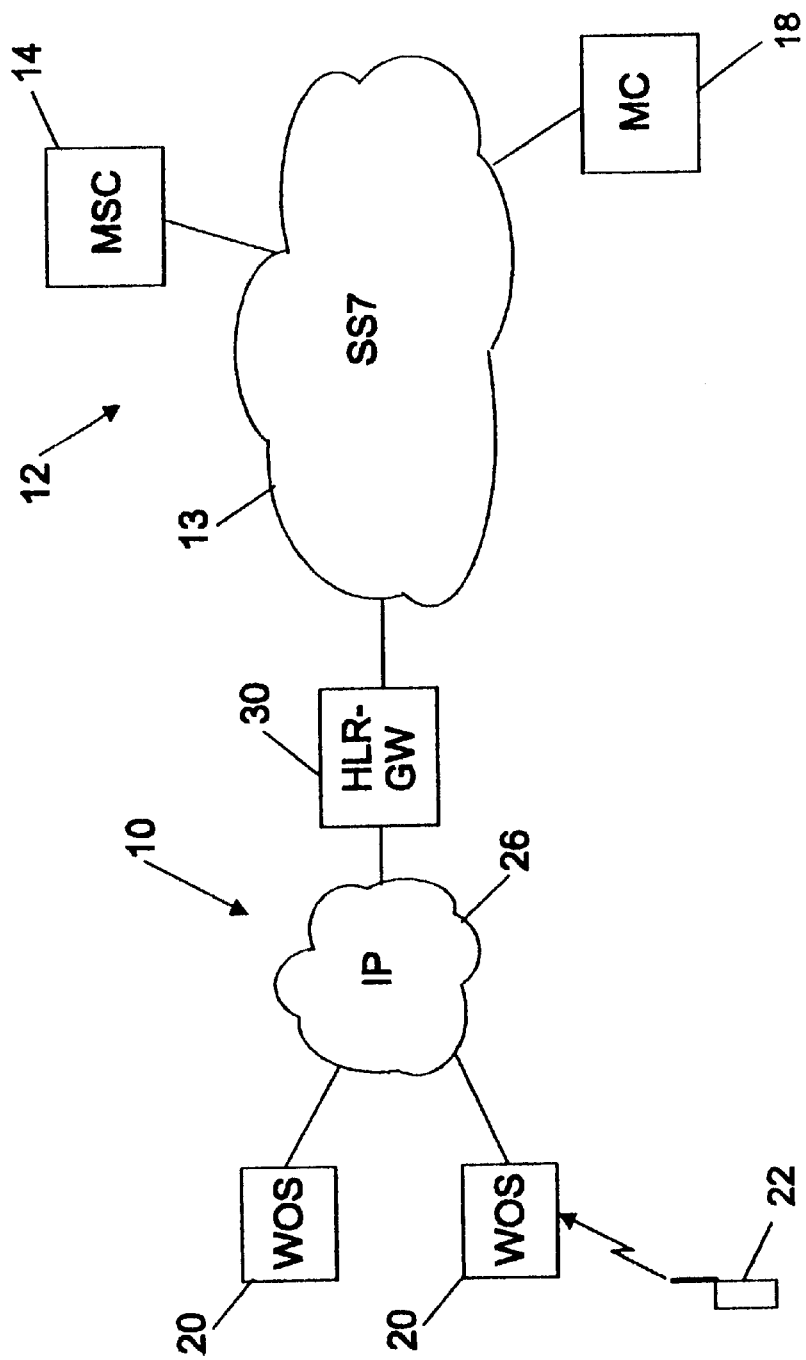
FIG. 3 is a network block diagram illustrating a wireless office system associated with a public land mobile network according to the invention.

Referring to FIG. 3, a block diagram illustrates an improved system in which an HLR is integrated with a gateway, as represented by the HLR-GW block 30. Particularly, in accordance with the invention, the WOS gateway functionality is combined with an HLR in a single node. This functionality consists of software applications implemented on an integrated processing system in the form of a network server. Referring also to FIG. 4, the HLR-GW 30 includes a home location register (HLR) 32 and a WOS gateway 34. The HLR function 32 stores wireless user subscriber information for use both by the WOS system 10 and the PLMN 12. With the combined functionality ANSI-41 messages from the WOS system 10 are sent directly to the HLR 32 using TCP/IP protocols. Thus, the integrated HLR-GW 30 eliminates one or more physical nodes from prior systems.

As above, the WOS 20 uses the SCCP, TCAP and MAP layers of the SS7 protocol stack on top of the TCP/IP stack to transfer the messages to the HLR-GW 30. A WOSP stack is included between the SCCP stack and the TCP stack for addressing at both ends. The HLR-GW 30 uses the SCCP, TCAP and MAP layers of the SS7 protocol on top of the TCP/IP stack for connection to the IP network 26 and on top of an MTP layer for connection to the SS7 network 13.

The HLR 32 maintains SS7 routing information for the PLMN 12 and the WOS-GW 34 performs the protocol conversions and routing functionality of the prior gateway without the need of additional gateway nodes being configured with routing information.

The HLR-GW 30 has three main responsibilities. These responsibilities are the PLMN HLR, routing between SS7 nodes and the IP network 26, and WOS protocol termination.

The HLR function 32 serves the normal role as an HLR in the PLMN 12. The HLR 32 serves both subscribers using WOSs 20 and subscribers not using WOSs. From the PLMN 12 the HLR 32 is reached in the standard manner through the SS7 network 13. From the WOS 20, the HLR 32 is reached directly via the IP network 26 without any protocol conversions. Because the majority of messages between a WOS 20 and PLMN 12 are with the associated HLR, for those messages unnecessary processing and delays because of protocol conversion are avoided.

The HLR-GW 30 acts as an SS7 signaling transfer point (STP) with the interworking function between the SS7 MTP and TCP/IP. If global title (GT) is used to address the WOS 20, a translation between the GT and the associated IP address is done by the HLR/GW 30.

The WOS-GW 34 terminates WOS protocols. The WOS protocols may, for example, support monitoring of the connection between the WOS 20 and gateway 34, and transport of configuration messages. Administration of configuration information to be sent from the PLMN to the WOSs 20 is made through the HLR-GW 30. Thus, no extra nodes, in the form of separate gateways, have to be reached from the operation support system.

As described, the HLR-GW is an integrated software application running on a server. As is apparent, the HLR function 32 and the gateway function 34 could be separate software applications, running on one or more servers, withe the software applications interacting via a suitable network connection. In any event the HLR-GW 30 is configured to be a single node with respect both to the SS7 network 13 and the IP network 26.

Thus, in accordance with the invention, the wireless office gateway functionality is integrated with an HLR in a single node for both an SS7 network and an IP network.

We claim:

1. A router controlling message communication between a first wireless communication network that transmits and receives messages using a TCP/IP protocol and a second wireless communication network that transmits and receives messages using an MTP protocol, the router comprising:

an integrated processing system including a home location register (HLR) storing wireless user subscriber information, a first interface for communicating with the first wireless communication network using the TCP/IP protocol, a second interface for communicating with the second wireless communication network using the MTP protocol, and a gateway function operatively connected to the HLR and the first and second interfaces for controlling message transmission therebetween, wherein the HLR and the gateway function are integrated in a single node.

2. The router of claim 1 wherein the HLR stores subscriber information for users of both the first wireless communication network and the second wireless communication network.

3. The router of claim 2 wherein the gateway function transmits and receives HLR subscriber information with either network directly without protocol conversion.

4. The router of claim 1 wherein the gateway function converts protocol of messages between TCP/IP and MTP for messages to be transferred from one of the networks to the other of the networks.

5. The router of claim 4 wherein the gateway function translates global titles received from the second wireless communication network to IP addresses for the first wireless communication network.

6. The router of claim 1 wherein the gateway function operates as a signaling transfer point for the second wireless communication network via the second interface.

7. The router of claim 1 wherein the gateway function operates as a termination point for first wireless communication network protocols.

8. The router of claim 7 wherein the first wireless communication network protocols support monitoring of communication between the first wireless communication network and the gateway function.

9. The router of claim 7 wherein the first wireless communication network protocols support transport of configuration messages.

10. An integrated gateway and home location register system for transmitting and receiving message in a wireless communication network comprising:
a processing system including a home location register (HLR) storing wireless user subscriber information, a first interface in communication with a wireless office system (WOS) network for routing messages using the TCP/IP protocol, a second interface in communication with a public land mobile network (PLMN) for routing messages using the MTP protocol, and a gateway function operatively connected to the HLR and the first and second interfaces for controlling message transmission therebetween, wherein the HLR and the gateway function are integrated in a single node.

11. The system of claim 10 wherein the HLR stores subscriber information for users of both the WOS network and the PLMN.

12. The system of claim 11 wherein the gateway function transmits and receives HLR subscriber information with either network directly without protocol conversion.

13. The system of claim 10 wherein the gateway function converts protocol of messages between TCP/IP and MTP for messages to be transferred from one of the networks to the other of the networks.

14. The system of claim 13 wherein the gateway function translates global titles received from the PLMN to IP addresses for the WOS network.

15. The system of claim 10 wherein the gateway function operates as a signaling transfer point for the PLMN via the second interface.

16. The system of claim 10 wherein the gateway function operates as a termination point for WOS network protocols.

17. The system of claim 16 wherein the WOS network protocols support monitor communication between the WOS network and the gateway function.

18. The system of claim 16 wherein the WOS network protocols support transport of configuration messages.

19. A communication device, comprising:
a home location register (HLR);
a gateway coupled to the HLR to route signals between a wireless office system using a TCP/IP protocol and a public land mobile network (PLMN) using an MTP protocol; and
a WOSP stack between an SCCP stack and a TCP stack to route the signals between the wireless office system and the PLMN.

20. A method of communicating between networks, comprising:
stacking SCCP, TCAP and MAP layers on TCP and IP layers; and
inserting a WOSP layer between the SCCP layer and the TCP layer.

21. The method of claim 20, further comprising stacking the SCCP, TCAP and MAP layers on an MTP layer for communication with an SS7 network.

22. The method of claim 20, further comprising performing global message translation (GTT) on messages from a wireless office system (WOS).

23. The method of claim 20, further comprising converting messages from riding atop a TCP/IP stack to riding atop an MTP layer.

24. The communication device of claim 19, wherein the HLR and gateway are combined to form an integrated software application.

25. The communication device of claim 24, wherein the HLR and gateway are configured to be a single node.

26. A communication system, comprising:
a first network using one protocol;
a second network using another protocol; and
a home location register (HLR) and gateway configured to be a single node for communication between the first network and the second network.

27. The communication system of claim 26, wherein the first network comprises an SS7 network.

28. The communication system of claim 26, wherein the second network comprises an IP network.

29. The communication system of claim 26, further comprising a server, wherein the HLR and gateway are an integrated software application running on the server.

* * * * *